United States Patent [19]
Susnjara

[11] Patent Number: 5,403,131
[45] Date of Patent: Apr. 4, 1995

[54] METHOD AND APPARATUS FOR TRIMMING FLASH FROM PLASTIC MOLDED PARTS

[75] Inventor: Kenneth J. Susnjara, Santa Claus, Ind.

[73] Assignee: Thermwood Corporation, Dale, Ind.

[21] Appl. No.: 167,417

[22] Filed: Dec. 14, 1993

[51] Int. Cl.$^6$ ............................................. B23Q 1/02
[52] U.S. Cl. .................................... 409/131; 409/138; 409/140; 409/197; 409/219
[58] Field of Search ............ 51/240 R; 409/131, 132, 409/138, 139, 140, 141, 189, 190, 197, 199, 219, 225, 903

[56] References Cited

U.S. PATENT DOCUMENTS

| | | | |
|---|---|---|---|
| 2,467,276 | 4/1949 | Slater | 409/219 |
| 2,782,661 | 2/1957 | Lewis | 409/219 |
| 3,355,990 | 12/1967 | Thum | 409/219 |
| 4,979,283 | 12/1990 | Kurita et al. | 409/140 |

Primary Examiner—Daniel W. Howell
Attorney, Agent, or Firm—Lalos & Keegan

[57] ABSTRACT

An improved worktable for cutting and machining operations, and particularly for removing flash from plastic parts, includes a floating work surface. The floating work surface is slidably supported on a lower fixed surface by a cushion of air. Four guides, one on each side of the floating work surface, permit translational movement of the floating surface during deflashing of a plastic part, while inhibiting rotational movement of the surface and part.

22 Claims, 2 Drawing Sheets

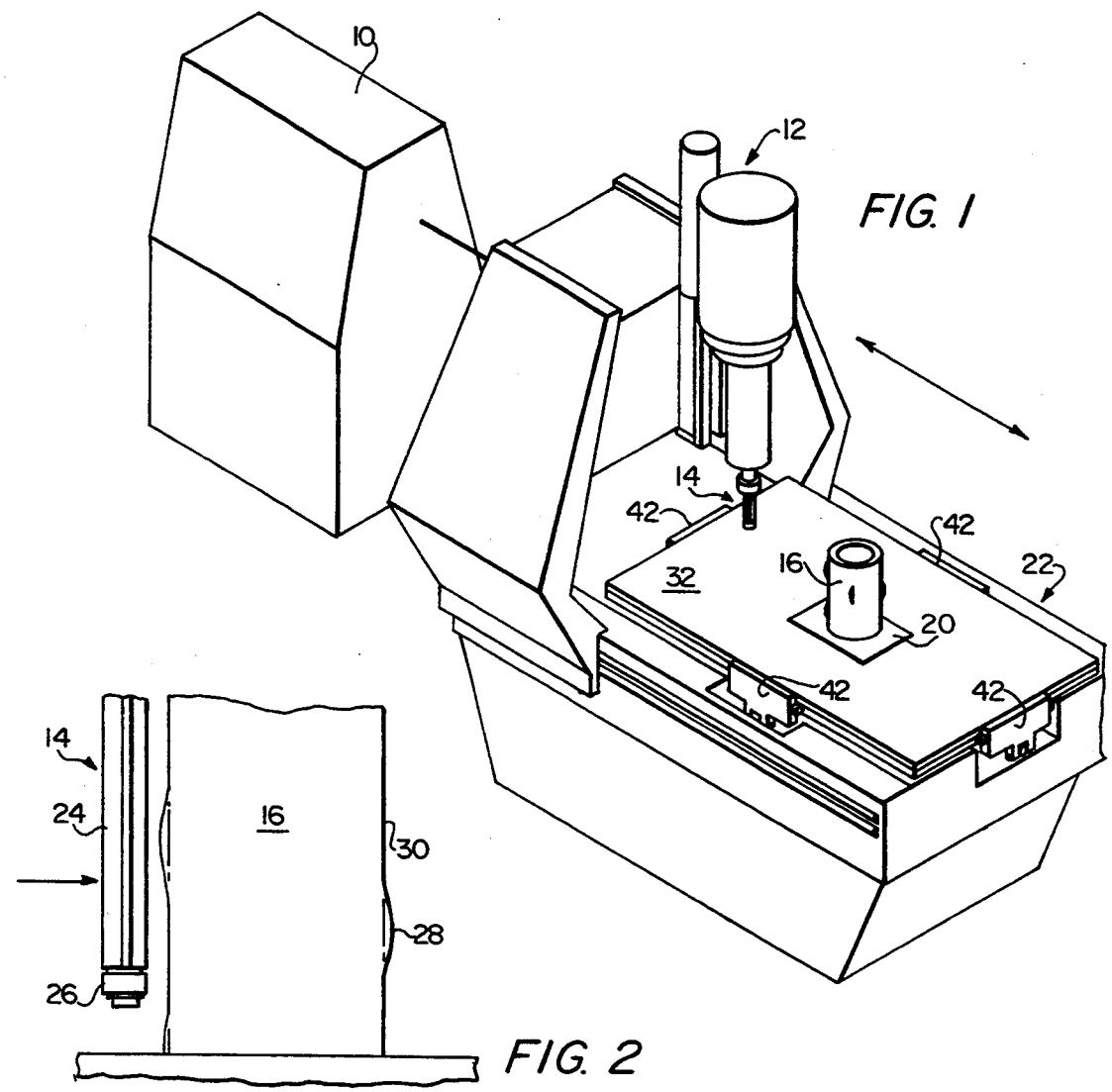
FIG. 1
FIG. 2
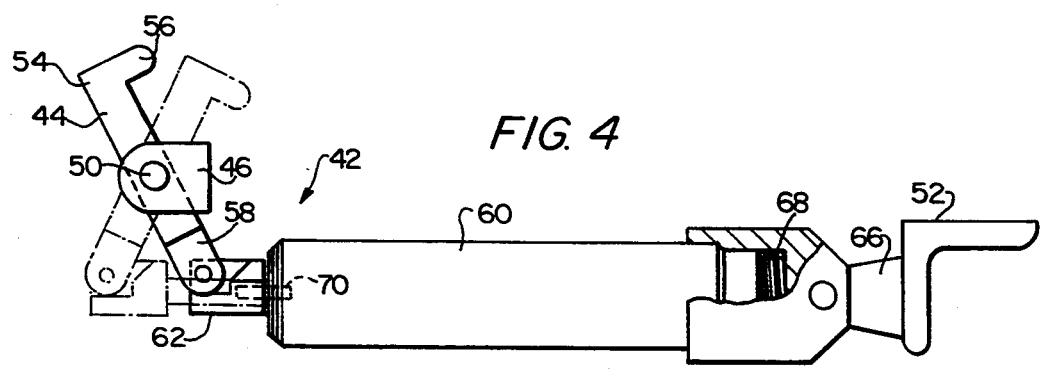
FIG. 4

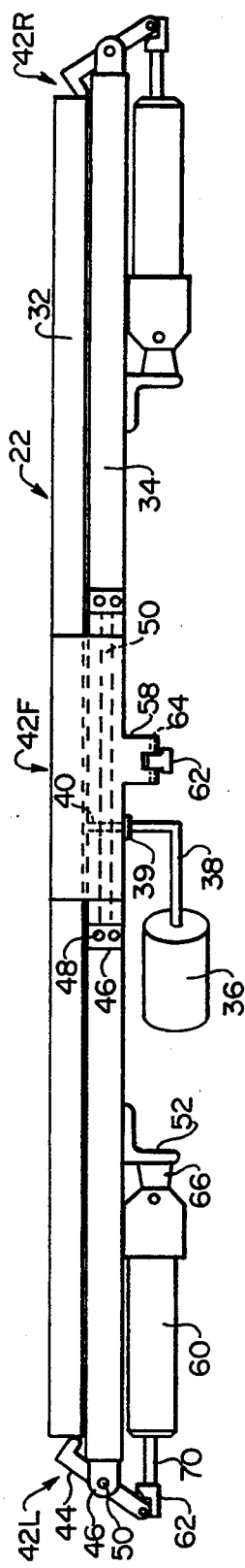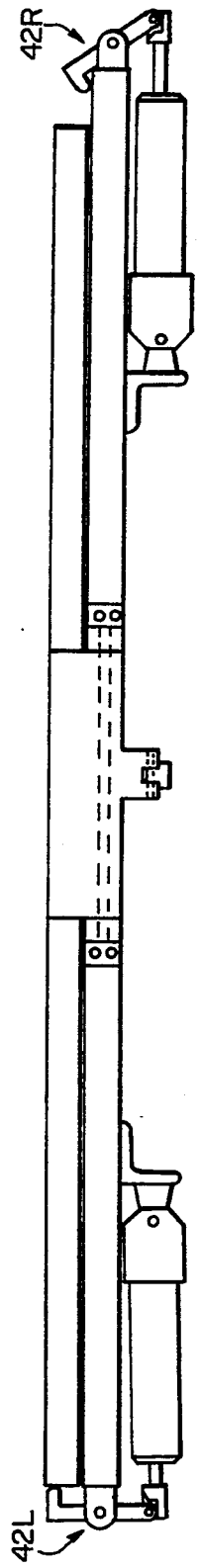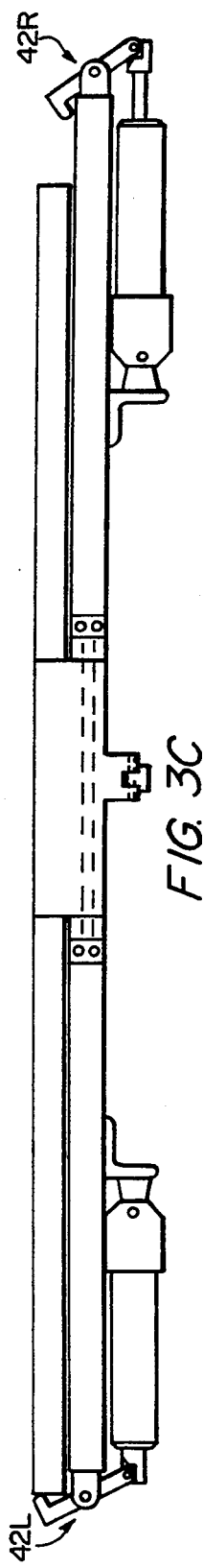

METHOD AND APPARATUS FOR TRIMMING FLASH FROM PLASTIC MOLDED PARTS

FILED OF THE INVENTION

The present invention relates to methods and apparatus for cutting or machining parts and more particularly to removing flash from plastic parts automatically with computer numerical control (CNC) tools.

BACKGROUND OF THE INVENTION

Many plastic processes such as injection molding, blow molding, compression molding and reaction injection molding among others produce parts which may have flash (extraneous material) that must be removed after the part is molded. Removing this flash by hand is a difficult and physically demanding task. The repetitive nature of the task can lead to repetitive motion injuries such as carpel tunnel syndrome.

Efforts to automate this task using CNC machine tools have encountered several difficulties. The flash must be trimmed to blend with the surrounding part surfaces; however, it is the nature of many plastic parts that the part size and shape may vary from part to part. Therefore it is not possible to create a CNC program to properly trim the part with the precision often required.

An attempted solution to this problem was the development of a "floating head" which was intended to allow the machining head to float and be guided by a bearing on the tool which rolled on the part guiding the trim operation. This approach has certain limitations. The size of the mechanism prevents its use on many parts and makes it difficult to mount on many CNC machines, especially 5 axis heads intended to machine three dimensional parts. Also, it may be necessary to perform both conventional machining, which requires a rigid head, and de-flashing, which requires a floating head on the same part.

SUMMARY OF THE INVENTION

The present invention solves the problem set forth above by providing a unique worktable on which a workpiece (e.g. plastic part) is positioned for cutting, trimming, etc. CNC machine tools usually operate in one of two modes: (a) the head of the machine tool remains in a fixed position while the workpiece is manipulated about it; or (b) the workpiece remains in a fixed position on a stationary table and the head of the machine tool is moved about the workpiece in a preprogrammed manner.

The present invention utilizes the second mode of operation. However, as discussed above, plastic parts are often inconsistent in exact size and shape. Therefore, when the cutting tool (e.g. a router bit) moves about the part in a preprogrammed pattern, which is based upon the ideal or nominal part size, it may perform inexact cutting on parts fixed to the table that are inexact in shape.

The present invention overcomes the problems associated with removing flash from varying shaped parts by allowing the part to move somewhat under the influence of the cutting tool, which always traverses a fixed pattern. The cutting tool is equipped with a ball bearing guide that allows the tool to follow along the plastic part so that the tool can trim the flash even with the surface of the part. However, to accommodate variations in the part size, the part is allowed to move when the tool encounters a shape that varies from its preprogrammed pattern. This is in contrast to prior approaches in which the cutting tool moves from its preprogrammed pattern to accommodate variations in part shapes.

To permit the plastic part to move, the present invention utilizes a novel table on which the workpiece (part) is fixed. The working surface of the table is allowed to "float" in relation to bottom of the table, which is fixed in relation to the ground and thus in relation to the CNC machine. The unique table of the present invention consists of two flat metal plates, one located on top of the other. Compressed air is forced through a hole in the bottom plate which creates a cushion of air allowing the top surface to slide on the bottom surface with very little friction. A set of guides is attached to the bottom surface to position the top "floating" surface. Each guide includes a long pivot arm that is pivotally mounted to the edge of the bottom surface. The top edge of the pivot arm contacts, but is not connected to the edge of the top surface. The other end of the pivot arm is pivotally connected to a combination compression spring and shock absorber.

A guide with pivot arm is located on all four edges of the table so that when all four shock absorber/compression spring units are fully extended, the top floating surface is centered on the bottom surface. A fixture to hold the plastic part is mounted to the top surface. A router bit equipped with a ball bearing guide is used for trimming. The ball bearing guide moves along the plastic part allowing the router bit to trim the flash even with the surface of the part.

To trim a part using a CNC machine tool, the router with ball bearing guide is programmed to contact the plastic part and to push to some degree the plastic part, fixture and table from its center position. The guides with pivot arms keep the top table from rotational motion but allow it to translate. The spring in the spring/shock absorber unit pushes the table, fixture and part against the router bit and ball bearing guide. The shock absorber dampens transient mechanical motion allowing a smooth cutting action. The spring keeps the part against the router bit and ball bearing guide even if there are variations in the part.

Other features and advantages of the present invention will become apparent to those having ordinary skill in the art to which the present invention pertains from the following detailed description taken in conjunction with the accompanying drawings.

BRIEF DESCRIPTION OF THE DRAWINGS

FIG. 1 is a perspective view of the present invention utilized in a CNC system.

FIG. 2 is a detailed view of the cutting tool utilized in the present invention in position relative to a plastic part from which flash is trimmed.

FIGS. 3A–3C illustrate the relative positions of operative parts of the present position during an example operation.

FIG. 4 is a detailed view of the table guide of the present invention.

DETAILED DESCRIPTION

The method and apparatus of the present invention are best suited in a system shown generally in FIG. 1, which includes a computer numerical control (CNC) controller 10, a cutting or milling machine 12 with cutting tool 14 for performing work operations on a workpiece 16. Workpiece 16 is held stationary on working surface 32 of table 22 by fixture 20. As is conventional, CNC controller 10 is programmed to control cutting machine 12 to move cutting tool 14 through a prescribed path or pattern. In the present invention, the cutting tool 14, as best shown in FIG. 2, includes a router bit 24 equipped with a ball bearing guide 26. In operation, ball bearing guide 26 moves along the surface of plastic part 16. Moving in accordance with its preprogrammed pattern, ball bearing guide 26 will apply some transverse force against plastic part 16. This allows the router bit 24 to trim the flash 28 even with surface 30 of part 16.

In the present invention, plastic part 16, fixture 20 and working surface 32 of table 22 are capable of transverse movement in response to force from cutting tool 14, specifically ball bearing guide 26. FIG. 3 illustrates table 22 of the present invention which permits transverse movement of the plastic part. Table 22 includes a movable ("floating") upper surface 32 and a lower fixed surface 34. Surfaces 32 and 34 are preferably metal plates. Compressed air from a source, illustrated generally as 36 in FIG. 3A, is delivered through an appropriate conduit 38 with nozzle 39 and through a hole 40 in lower surface or plate 34 to create a cushion of air between plates 32 and 34. This permits plate 32 to slide on plate 34 with very little friction. Alternative forms of slidable support for plate 32 include low friction ball bearings or roller bars.

In a preferred embodiment, table 22 includes four guides 42 located on the perimeter of upper plate 32, preferably each being centrally located on each of the four sides of plate 32. FIG. 3 illustrates left and right guides 42L and 42R respectively and a portion of front guide 42F. Rear guide 42R (not shown) is located adjacent plate 32 on the side opposite to front guide 42F.

Referring to FIGS. 3 and 4, each guide 42 includes a pivot arm 44 that is centrally and pivotally mounted to bottom plate 34 via central support 46. Central support 46 is attached to bottom plate 34 by screws or bolts 48 (FIG. 3) and includes a pivot rod 50 (FIG. 4). Pivot rod 50 extends through an opening in pivot arm 44 along its length and pivotally supports arm 44. Pivot arm 44 includes an upper end 54 with head 56 for contact with an outside edge of movable upper plate 32. Lower end 58 of pivot arm 44 is pivotally connected to an actuator 60. Lower end 58 comprises a clevis 58 (FIG. 3) that straddles pivot block 62 of actuator 60. A second lower pivot rod 64 is connected between the two legs of clevis 58 and extends through pivot block 62 to provide pivotal support for arm 44.

Actuator 60 is connected to the bottom of lower plate 34 through angle mount 52, which is secured to plate 34 by screws or bolts. Connected to angle mount 52 is clevis 66 from which actuator 60 is suspended. Actuator 60 is a combination compression spring and shock absorber. The compression spring portion, illustrated as 68 as in FIG. 4 resiliently urges piston rod 70 out of actuator 60. As will be readily appreciated, this force will cause pivot arm 44 to pivot about rod 50 of center support 46 and urge head 56 against an edge of movable upper plate 32. The four actuators 60 are mounted such that when their respective piston rods 70 are fully extended, they bias movable upper plate 32 into a central position on fixed lower plate 34. This operative position is shown in FIG. 3A.

During a deflashing operation, the router bit 24 with ball bearing guide 26 moves along and pushes against plastic part 16. This in turn causes the fixture 20 and movable upper plate 32 to also be pushed off of center with lower fixed plate 34. The spring 68 of actuator 60 through the respective pivot arm 44 oppositely positioned from router bit 24 will oppose but not completely negate the pushing force of the ball bearing guide. In this manner the action of a respective spring maintains the part against the ball bearing guide of the router bit even if there are variations from normal in the part size and shape. Each of four actuators 60 and respective pivot arms 44 on each of the four sides of movable upper plate 32 permit limited translational movement while preventing rotational movement.

FIGS. 3A, 3B and 3C illustrate the relative positions of upper plate 32 and actuators 60 during an example operation. Figure 3A illustrates the initial position with piston rods 70 fully extended and upper plate 32 centered on lower plate 34. FIG. 3B illustrates an operating position in which the router bit and ball bearing guide is traversing a side of the plastic part toward guide 42R and thus pushing the part and plate 32 in the direction of guide 42L. In such position, piston rod 70 associated with guide 42L will be partially retracted. FIG. 3C illustrates an operating position similar to FIG. 3B but wherein the ball bearing guide contacts a further outwardly extending surface of the part (e.g. a surface extending beyond the expected norm toward guide 42R), thus causing the part and plate 32 to move further in the direction of guide 42L. In such position, piston rod 70 associated with guide 42L is fully retracted and pivot arm 44 prevents any further movement of plate 32 in the direction of guide 42L. In the operative examples of FIGS. 3B and 3C, guide 42R will remain in the same position as illustrated in FIG. 3A, i.e. with piston rod 70 fully extended. The shock absorber function of each actuator 60 is to dampen spring oscillations and provide for a smooth trimming operation.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An improved worktable for cutting and machining operations performed on a workpiece comprising:
    a fixed lower surface;
    a movable upper surface for supporting said workpiece;
    means for slidably supporting said movable upper surface on said fixed lower surface;
    means for biasing said movable upper surface into a predetermined position relative to said fixed lower surface.

2. An improved worktable as in claim 1 wherein said means for slidably supporting said movable upper surface includes an air cushion between said upper and lower surfaces.

3. An improved worktable as in claim 2 wherein said slidably supporting means includes a source of compressed air.

4. An improved worktable as in claim 1 wherein said means for biasing includes at least one guide located on the perimeter of said movable upper surface.

5. An improved worktable as in claim 4 wherein said means for biasing includes at least one actuator connected to said guide.

6. An improved worktable as in claim 4 wherein said actuator includes a spring means for resiliently urging said guide against said upper surface.

7. An improved worktable as in claim 6 wherein said spring means includes a compression spring.

8. An improved worktable as in claim 6 wherein said actuator includes means for dampening spring oscillations.

9. An improved worktable as in claim 8 wherein said means for dampening spring oscillations includes a shock absorber.

10. An improved worktable as in claim 4 wherein said actuator includes a compression spring and a shock absorber.

11. An improved worktable as in claim 5 wherein said guide includes a pivot arm with a first end for contact with said movable upper surface and a second end connected to said actuator.

12. An improved worktable as in claim 11 including means for pivotally supporting said pivot arm.

13. An improved worktable as in claim 12 wherein said means for pivotally supporting includes a central support arm connected to said fixed lower surface.

14. An improved worktable as in claim 1 wherein said means for biasing includes a plurality of guides located on the perimeter of said movable upper surface.

15. An improved worktable as in claim 14 wherein said means for biasing includes a plurality of actuators each one of said actuators connected to a respective one of said guides.

16. An improved method for cutting and machining a workpiece mounted on a working surface of a worktable including:
    providing a fixed lower surface for said worktable;
    slidably supporting a movable upper working surface on said fixed lower surface;
    biasing said movable upper surface into a predetermined central position relative to said fixed lower surface.

17. An improved method as in claim 16 including the step of moving said movable upper working surface from its predetermined central position during operations performed on a workpiece mounted on said working surface.

18. An improved method as in claim 17 wherein the step of moving said upper surface includes the step of pushing said workpiece with a machining tool.

19. An improved method as in claim 17 wherein the step of slidably supporting said upper surface includes the step of providing a cushion of air between said upper surface and said lower surface.

20. An improved method as in claim 16 wherein the step of biasing includes contacting the perimeter of said upper surface with at least one of a plurality of guides.

21. An improved method as in claim 20 wherein the step of biasing includes forcing at least one of said plurality of guides into contact with said upper surface under force of a spring.

22. An improved method as in claim 21 including the step of dampening spring oscillations using a shock absorbing means.

* * * * *